A. OLANDER & A. OLANDER.
Window-Mirrors.
No. 137,383.  Patented April 1, 1873.
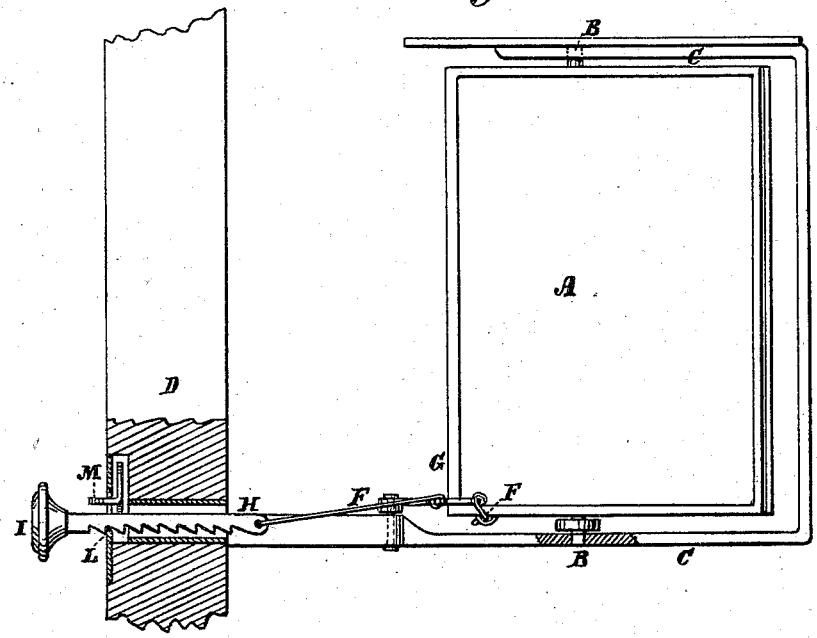
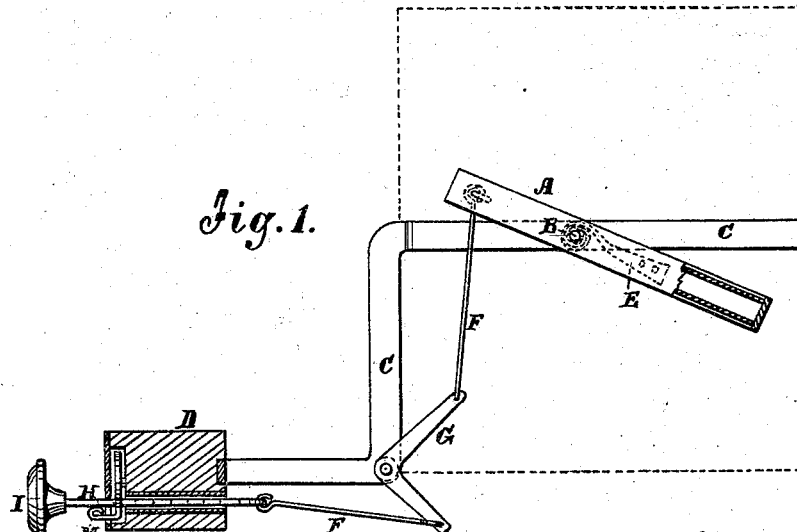

UNITED STATES PATENT OFFICE.

ALFRED OLANDER, OF GLEN GARDNER, NEW JERSEY, AND ALBERT OLANDER, OF NEW YORK, N. Y.

IMPROVEMENT IN WINDOW-MIRRORS.

Specification forming part of Letters Patent No. 137,383, dated April 1, 1873; application filed March 1, 1873.

*To all whom it may concern:*

Be it known that we, ALFRED OLANDER, of Glen Gardner, in the county of Hunterdon and State of New Jersey, and ALBERT OLANDER, of the city, county, and State of New York, have invented a new and Improved Street-Mirror Attachment for Windows, of which the following is a specification:

For an outside mirror-attachment to windows, by which to obtain views of the street in either direction, we propose to have a double mirror mounted on vertical pivots at the center, to turn about a quarter of a revolution, so that either side can be used by changing it slightly; and for changing it we have a pull-piece inside of the room connected to the mirror by a bell-crank and rods for turning it in one direction, and a spring in the space between the two mirrors acting on one or both of the pivots for turning it in the other direction; and for holding it against the action of the springs, the pull-piece has ratchet-notches and engages with a catch.

Figure 1 is partly a top view and partly a horizontal section of our improved mirror attachment to windows. Fig. 2 is partly a side elevation and partly a sectional elevation.

Similar letters of reference indicate corresponding parts.

A represents the double mirror, which is mounted on vertical pivots B at the center, in a suitable frame, C, which is attached to the window-frame D, and so shaped as to hold the mirror sufficiently in front of the window to allow either side to be seen from the room when adjusted obliquely to it, as indicated in Fig. 1, or in the opposite inclination. A spring, E, (shown dotted in Fig. 1,) is arranged between the two mirrors with the pivots so as to constantly tend to swing the mirror to the position shown in Fig. 1, for exposing the front side to view from the window for observing the street in that direction; and it is connected, by the rods F and bell-crank G, with a ratchet-bar, H, passing through the window-frame D into the room, and having a knob, I, on the inner end, for pulling the mirror around so as to expose the other side to view from the room, to observe the street in the other direction; and a catch, L, is provided to hold the bar, when pulled in, against the tendency of the spring to pull it back. This catch is on the upper side of the bar, and a spring, M, is used to hold it up to the catch.

Thus it will be seen that we can readily adjust the mirror so that by it we can look along the street, in either direction, from within the house to which it is attached.

Having thus described our invention, we claim as new and desire to secure by Letters Patent—

1. The combination of a double mirror, A, pivoted as described, a spring, E, and pull-piece I, when attached to a house, and the said spring and pull-piece arranged for actuating the mirror in opposite directions, as specified.

2. The combination of pull-piece I, ratchet-bar H, and catch L, with the pivoted mirror A and its spring E, as specified.

ALFRED OLANDER.

Witnesses:
LOUIS L. HUNT,
WILLIAM S. BROWN.

ALBERT OLANDER.

Witnesses to signature of ALBERT OLANDER:
C. SEDGWICK,
T. B. MOSHER.